United States Patent [19]

Soskuthy

[11] 4,410,613

[45] Oct. 18, 1983

[54] PROCESS AND EQUIPMENT FOR ENLARGEMENT OF COLOR-BALANCED PRINTS IN ADDITIVE SYSTEM

[75] Inventor: Miklós Soskuthy, Budapest, Hungary

[73] Assignee: Ofotert Optikai Finommechanikai es Fotocikkeket Ertekesito Vallalat, Budapest, Hungary

[21] Appl. No.: 301,968

[22] Filed: Sep. 14, 1981

[51] Int. Cl.³ .............................................. G03C 7/16
[52] U.S. Cl. ..................................... 430/30; 430/359; 355/35; 355/88; 356/425
[58] Field of Search .................. 430/30, 359; 356/425; 355/32, 35, 88

[56] References Cited

U.S. PATENT DOCUMENTS

| | | | |
|---|---|---|---|
| 3,685,900 | 8/1972 | Kirby et al. | 355/35 |
| 4,087,180 | 5/1978 | DiNatale | 355/32 |
| 4,211,558 | 7/1980 | Oguchi et al. | 430/30 |
| 4,310,248 | 1/1982 | Meredith | 356/425 |

FOREIGN PATENT DOCUMENTS

| | | |
|---|---|---|
| 1522103 | 8/1969 | Fed. Rep. of Germany . |
| 2821732 | 1/1979 | Fed. Rep. of Germany . |
| 1341288 | 12/1973 | United Kingdom . |

*Primary Examiner*—J. Travis Brown
*Attorney, Agent, or Firm*—Murray Schaffer

[57] ABSTRACT

The invention relates to a process and an equipment for making color enlargements in additive method, where the device can be fitted onto the traditional enlargers. By using the solution according to the invention the arrangement of the additive color filters under the lens of the enlarger can be solved in a stable but not containing manner, simultaneously ensuring easy and alternating actuating and integration of the colors of the negative. By means of the comparative process, by using the color-analyzer mask and the properly dark colored reference standards belong to the equipment, the color and density balance of the prints to be enlarged can be adjusted by the way of one single trial development, independent of the individual subjective color perceptional ability.

6 Claims, 6 Drawing Figures

PROCESS AND EQUIPMENT FOR ENLARGEMENT OF COLOR-BALANCED PRINTS IN ADDITIVE SYSTEM

BACKGROUND OF THE INVENTION

The invention relates to a process and equipment for enlargement of colour-balanced colour prints in additive systems, where in course of correction filtering, colour filters are arranged in the path of the beam of light of the objective of the enlarger beneath the lens, where they are alternately actuated. At the same time the time of exposure needed for obtaining the colour-balanced picture is determined by means of a trial picture. The colour control and integrating equipment, i.e. the outfit for the realization of the process and forming an object of the invention, contains additive colour filters and an integrating plate which is to be held under the objective.

A colour-analyser mask is employed as a part of the process and also forming an object of the invention, contains additive colour filters and a grey wedge.

By using the process and the equipment according to the invention traditional enlargers may be rendered suitable for producing colour-balanced enlargements, as well as simultaneously determination of the proper time of exposure.

According to the prior art equipment suitable for coloured enlargements are based mostly on the subtractive process. Complete enlargers being suitable for coloured enlargements based on the additive method have been produced in some countries (e.g. USA, GFR, Italy, etc.). However, these are so expensive that the purchase thereof for the majority of amateurs becomes simply impossible, at least it is far too uneconomical. High prices result first of all from the fact that electronic means and dichroic colour filters are built-in to such equipment to an increasing extent. The same stands for the enlargers based on the subtractive system and the colour analysers, which can be separately purchased.

For a majority of the amateurs the only possibility so far offered by the market is to supplement their traditional black-and-white enlargers with colour filtering means needed for the coloured enlargement. However, in course of coloured development the most difficult task is to learn the so-called colour filtering, representing an essential condition for obtaining colour-balanced pictures, requiring—according to our experiences—extensive theoretical knowledge and long practice. These requirements, however, surpass the possibilities of an average amateur or hobby-photographer.

Complementary instruments, such as a colour-analyser and the expensive electronic enlargers have worked well in professional developing installations, but do not offer help for the amateurs for home-work. The prerequisite for reliable operation of such equipment lies in the maintenance of the technological processes on a controlled, continuous and stable level. This requirement cannot be met in the domestic laboratories of the amateurs, being the bathroom in a majority of cases. Any change in the factors of development leads to colour-shift and there is not a single electronical device which could evaluate these phenomena in advance.

After having recognized the difficulties, some experiments were already performed in the fifties, to establish a process based on the additive system, by using either the so-called colour wedge which could be produced by crossing three (blue, green and red) colour filters and a photographic grey wedge or by using colour filters which had gradually darkening colour density. The essence of this method is, that the colours of the negative picture are integrated to grey by the aid of a diffuser and are projected on to the photographic paper, while the times of exposure suitable for adjusting the colour balance had to be determined by recognizing the faintest grade of the colour steps of the paper picture. This theory has been adapted and developed, in so far as graphic markings were used to promote the perception of the "faintest" colour, being utmost subjective in regard to judgement. Such a method is described in the British patent specification No. 1 341 288 (Exposure Calculator and Filter Device for Darkroom Color Photography).

Experiments are also known, which aimed—taking the proposals of the contemporary technical literature as a basis—to fasten the additive colour filters to the lens of the enlarger. This method has been adapted by the cited British patent but the solution was applied by other apparatuses too; as an example the additive filter-set "Tricolor" of SIMMARD.

However, the solutions mentioned involved serious defects and errors. The most decisive error was represented by the basic principle itself, which was maintained as a common characteristic of all the methods having been used up to now, despite their differing versions; namely the recognition of the faintest shades of colours. Any of the developed photographic materials shows the characteristic feature, in so far that the density of the negative is proportional to the quantity of the incident light but within certain limits, in the straight section of the so-called density curve. In the initial slowly ascending part of the curve, just where limit darkening of the negative becomes visible, density follows the change of light intensity far slower, than in the larger or straight section of the curve. This regular phenomenon is accompanied by the practical consequence, that the beginning of the limit-blackening recognized by the eye, i.e. the faintest shade hardly changes in dependence of even a considerable increase of exposition, although such differences in exposition are sufficient to already disturb the colour-balance. Furtheron, this method could be applied only where the effective shades of colour of the yellow, magenta and cyan colour grades of the photographic paper are in an accurate mutual distance within the colour cycle and the same quantities, i.e. were the same limit values result in the grey colour. However, in practice this is impossible. Sometimes the factories producing photographic materials use colouring agents having a quite different character and considerably differing wavelength than at other times. As a consequence, this method has proved erroneous and inaccurate from several points of view. It is for this reason, that the colour wedge—being perfect in itself, as means—has been almost forgotten.

The second main disadvantage lays in the fact that the additive colour filter device was fastened to the lens of the enlarger. This solution can be considered as unsuccessful from several points of view. First of all, because the lenses are sunk in several enlargers and do not protrude from the lower supporting frame, accordingly attachment becomes impossible. Secondly, in a majority of cases the solution prevents the regulation of the diaphragm, since the clamped device blocks its path. Thirdly, the lens is rather delicate, and it is unadvisable to burden it with a foreign load and to subject it to the clamping force needed for stable fixing of a separate device.

SUMMARY OF THE INVENTION

The aim of the invention is to eliminate the errors of the evaluating processes based on the recognition of the faintest colour shade, starting from the judgement of the limit-darkening. The proper judgement should not depend on the subjective colour perception of the individual. It is at the same time an aim of the invention to provide a colour sample, i.e. a coloured reference standard, taking the peculiar features of the photographic materials into consideration and yielding a basis for accurate calculation. Furtheron, the solution should offer simple and cheap equipment for realizing of the process.

By means of the light of the negative having been integrated by a diffuser, a trial picture is illuminated through the colour-analyser mask produced by the combination of the additive colour filters and the grey wedge with a time of exposure having been experimentally determined and prescribed in advance, in dependence of the applied translucent materials.

Hereafter, the gradually darkening fields of the yellow, magenta and cyan wedges appearing on the trail picture are compared to the coloured reference standard, the density of which amounts to min. 0.2D, accordingly, the darkening of the negative is at least by 50% higher, than the faintest shade which can be able recognized by eye.

By means of comparison the exposure times belonging to the colour-balanced picture are determined.

In accordance with the invention, the coloured reference standards are expediently prepared by developing the photographic paper having the same or similar character, as the product to be used in course of enlarging, or, by colouring other materials by some kind of dyestuff. In course of the preparation the colour density of the coloured reference standards is expediently set to the value within the range between 0.5 and 0.8D. Taking into consideration, that darkening of the negative falls into the straight section of the density curve, the human eye may well follow the changes of the density being proportional to the intensity of the illumination, accordingly, adjustment of the colour balance will be more accurate, than in the previous cases.

The realization of the new process is enabled by a simple and reliable technical solution, by means of which the additive colour filters may be fastened to the enlarger without touching the lens of it, thus eliminating the drawbacks of the previous solutions. This colour control and integrating structure containing the additive colour filters and the integrating plate (i.e. the diffuser)—otherwise called herein an "adapter" is fixed in accord with the invention to the lower part of the bellows of the lens or to the lamphouse or to the console of the enlarger and it is provided with adjusting and fixing elements for the adjustment in horizontal and vertical direction, respectively.

In a preferred embodiment of the colour control and integrating device the colour filtering and integrating means arranged in the path of the beam of light are placed in an aperture holding the filter and forming a common casing.

In a preferred embodiment of the filter holder the colour filter and integrating means arranged in the path of the light are arranged in five openings in a common mounting.

In a further embodiment of the colour control and integrating device the colour filter and the integrating means arranged in the path of the beam of the light are placed in the openings of separated mountings.

In accordance with the invention the colour-analyser mask containing the additive filters and the grey wedge is provided with a time scale calibrated in compliance with the coloured reference standards. Expediently, the time scale displays directly the times of exposure, although other codes or code system substituting the time scale may be also used.

BRIEF DESCRIPTION OF THE DRAWINGS

The invention will now be further described by way of Examples with reference to the accompanying drawings, in which.

DESCRIPTION OF THE INVENTION

Figure 1:
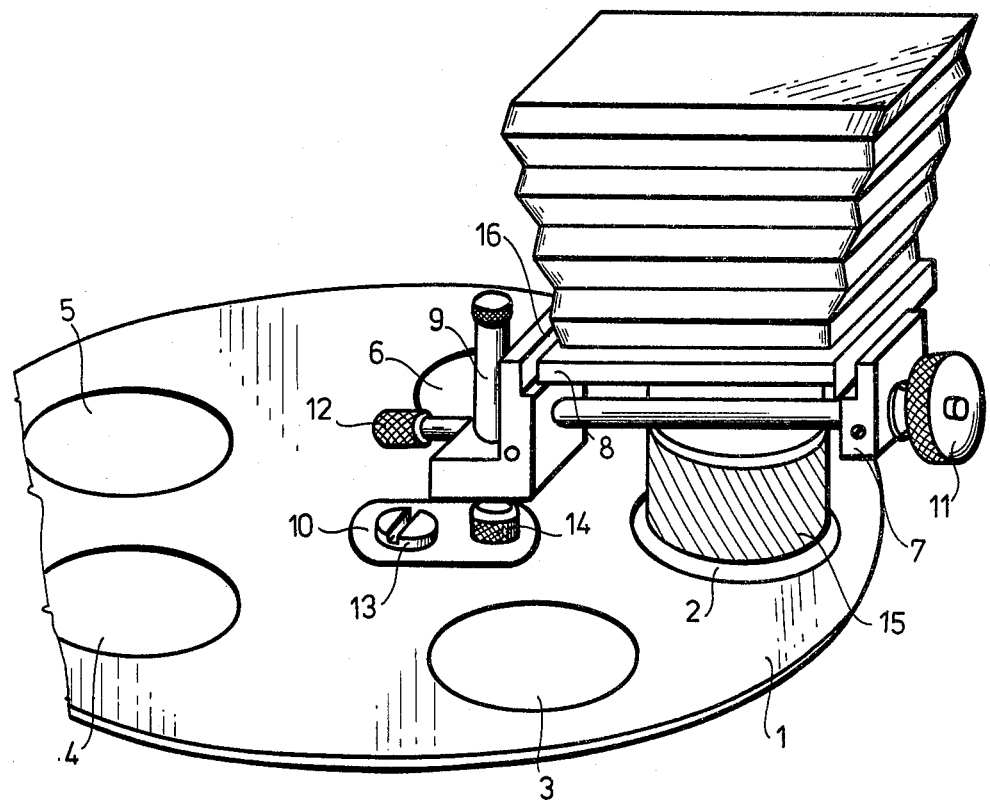
FIG. 1 is a perspective view showing the inventive filter support attached to an enlarger.
Figure 2:
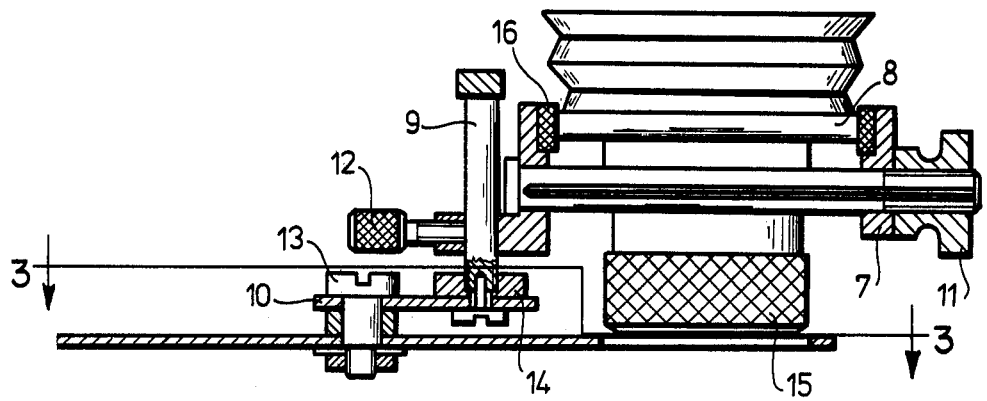
FIG. 2 is an elevational view, in diagrammatic section, of the apparatus of FIG. 1.
Figure 3:
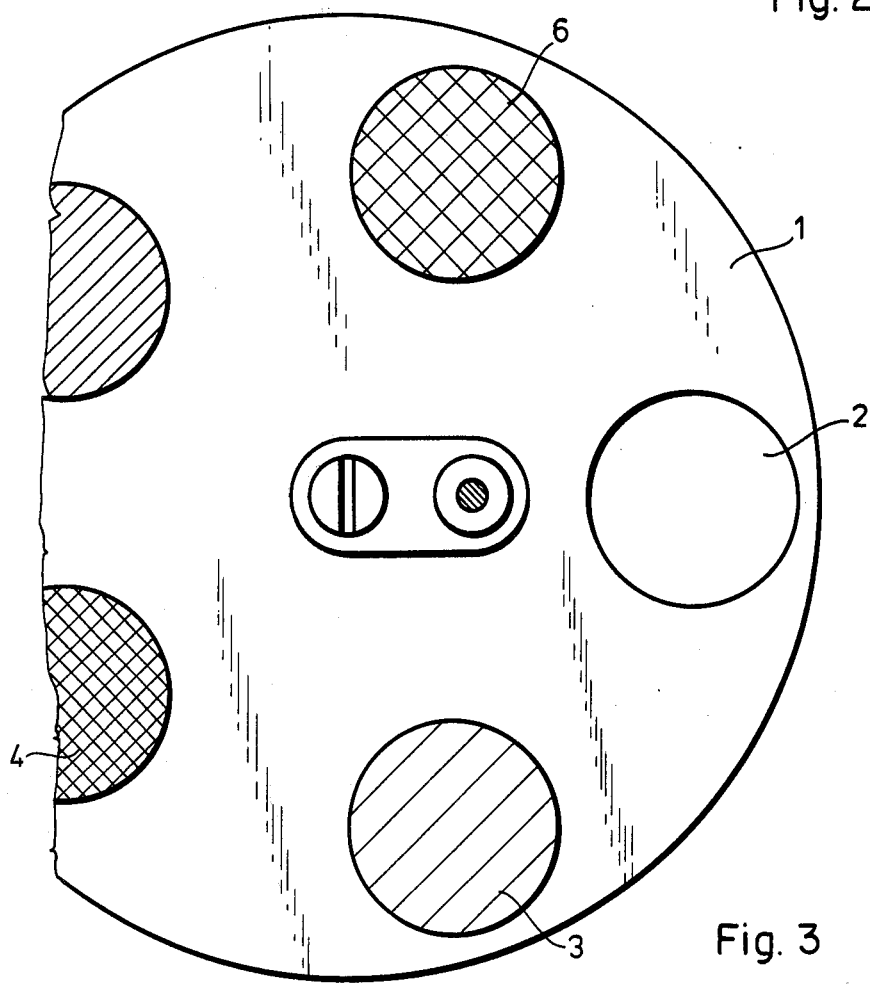
FIG. 3 is a view taken along the line 3—3 of FIG. 2.
Figure 6:
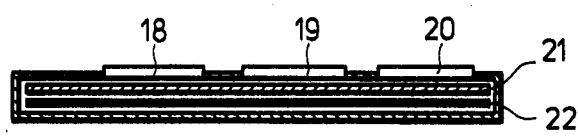
FIG. 6 is a cross-sectional view taken along line 6—6 of FIG. 4.

One of the possible embodiments of the colour filter and integrating means, alias adapter, are shown in FIGS. 1 and 2. With this embodiment a disc-shaped filter support 1 is mounted on the enlarger. The filter support has a vacant adjusting aperture 2, an integrating plate 3 (i.e. the diffuser), a blue colour filter 4, a green colour filter 5 and a red colour filte 6, sequentially arranged about the center. A frosted glass or a thin colourless transparent diffuse synthetic plate may be used as the integrator 3. The filter support 1 is fixed by means of clamping jaws 7 and a clamping screw 11. Inserts 16 made of rubber or a synthetic material are interposed to the lower supporting frame 8 of the bellows of the lens of the enlarger, i.e. on the edge of the frame. Adjustment of the filter support is made by displacing it in a vertical direction on a guide rod 9, and fixed by means of a screw 12. Adjustment in the horizontal direction is made by means of an excentric arm 10 fixed by means of a screw 14. In such a manner, the symmetrically arranged apertures 2 to 6 may be adjusted to be exactly aligned in the axis of the lens 15 and directly under its lower plane with a clearance distance of 1-2 mm. By rotating the disc-shaped filter support 1 around the pin 13 selective actuation becomes possible.

Any other solid e.g. a flat slide which may be displaced in a mounting may be used instead of the disc. A version is also possible, with which the diffuser and the colour filters are arranged in partly or entirely separated mounting and can be displaced individually below the lens, similarly to the red adjusting filter of the black-and-white enlargers.

The embodiment of the clamping jaw having been illustrated here may be substituted for by any other similar suitable clamp. The means serving for the horizontal and vertical adjustment can also be differently formed, e.g. by using hinges. Expediently a ratchet mechanism is arranged on the disc-shaped filter support enabling the accurate adjustment of the apparatus under the objective. It may also be expedient to indicate the position of the different colour filters on the rim of the disc by means of markings, or incisions to be felt by touch, in order to facilitate identification in the darkroom.

If for any reason the construction of the enlarger does not make it possible to fasten the device onto the lower supporting frame of the bellows, the clamping jaw may be fixed on any other suitable part of the enlarger, but never onto the lens itself. Such places are e.g. the upper part of the bellows or any other point of the lamphouse or the console of the enlarger. When necessary suitable complementary elements such as extensions may be connected to the adapter.

The second structural unit is represented by the colour-analyser mask, which serves for the adjustment of the colour balance in the process according to the invention.

Figure 4:
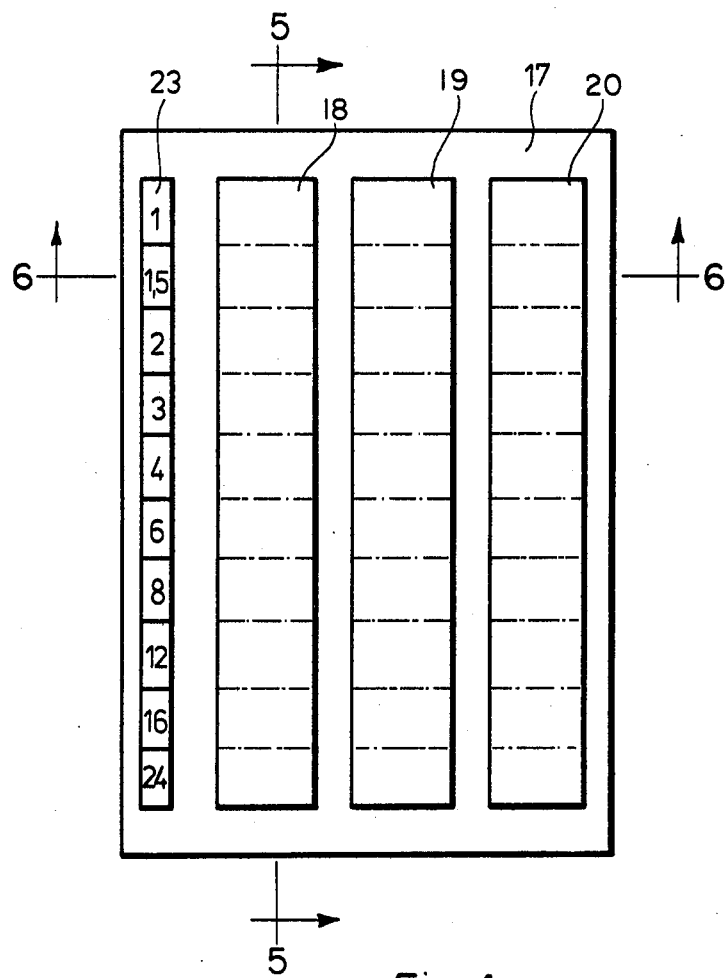
FIG. 4 is a plan view of one embodiment of the colour-analyser mask according to the present invention.
Figure 5:
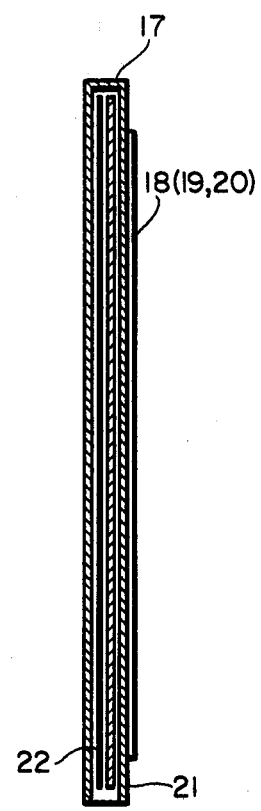
FIG. 5 is a cross-sectional view taken along line 5—5 of FIG. 4.

The colour-analyser mask as seen in FIG. 4, comprises a casing 17 formed by a flat box provided with three slot apertures on one face remindful of the film cassette of old-type cameras. In the longitudinal apertures blue 18, green 19 and red colour filters 20 are arranged, being of the same quality, as the additive colour filters arranged in the filter support 1. Directly underneath, a photographic grey wedge 21 (film)—illustrated in the figure in a sectional view—is arranged. The fields of graduation, lying perpendicularly to the direction of the slot openings as indicated by the perpendicular dash line are defined by the grey wedge which consists advantageously of 10 to 15 grades, darkening evenly and gradually e.g. by the value of +0.10 or +0.15D.

A coloured photographic paper 22 is slipped into the mask such that the side with the emulsion would be upwards facing the grey wedge. A time scale 23 can be made in several forms. In FIG. 4 the numerical values of the scale are accurately correlated with the density grades of the grey wedge. With simpler embodiments the numerical values of the time scale are written onto the colour-analyser mask itself, but a version is also possible, where the digits appear directly on the developed trial picture adjacent the coloured grades. In this case the time scale on the transparent film material is incorporated into the colour-analyser mask. The digits can be substituted by other signs, such as e.g. letter, in which event there is a special code for the calculation of the times of exposure.

The colour-analyser mask can be made in a more simple manner. For example the elements to be incorporated are enclosed between two sheets of glass fixed by an outer rim. Such a colour-analyser is simply placed over the photographic paper. Whatever form is chosen for the colour-analyser mask and for the time scale, the essential feature lies in that the numerical values should be calibrated in compliance with the coloured reference standard.

Calibration is realized in such a manner, that in course of production the time of exposure is determined experimentally. It is adapted fundamentally to the density of the translucent material having been applied, by means of which the light (integrated by the diffuser) of a negative of average colour distribution and grade of darkening, with a mediocre diaphragm aperture of the lens, e.g. f:8. When incident onto the trial paper a result is given, which meets a double requirement after development. The first requirement being that the time of exposure with additive filtering, during which a colour-balanced print can be enlarged without performing a separate test, will lie in the middle-range of the time scale. The second requirement being, that on the developed trial paper a field of averagely dark density should appear adjacent the digits. The lowest limit value of the desired density may equal to 0.2D, that means, that grade of darkening is by 50% higher, than the palest colour shade being visible to the eye on the colour print. According to practical measurements the density thereof lies in general at the value of approximately 0.05D, when the densitometer is set to zero, corresponding to the basic white colour of the paper. It seems to be, however, expedient to establish the grade of darkening in a value of 0.5 to 0.8D, which as already mentioned is most advantageous in respect to visual comparison.

The time of exposure value, having been determined by experiment is indicated in the manual of the apparatus for the accurate adjustment of the colour balance. The errors and inaccuracy of the previously used processes based on the use of a coloured wedge have been increased namely by the fact, that the time of exposure determining fundamentally the density of the trial picture was not prescribed at all, and when by chance it was it was so only in an approximate manner.

Conventional, coloured reference standards (not illustrated here) form an important adjunct of the invention in comparing density which results from the tests mentioned before, since their value is accurately fixed. The coloured reference standards are conventional colour samples and may be made in a most advantageous manner from the photographic paper having been already developed, although any other material coloured with a dyestuff may be used for this purpose. In order to be able to reach maximum accuracy, it is possible to put different reference standards into commercial circulation for photographic papers having different colour characteristics. However, the user himself can make a reference standard by simply cutting the proper square from the coloured trial wedge made of a different type of photographic paper. In order to facilitate comparison, the coloured reference standards are expediently made in a size corresponding to the fields (squares) of the coloured wedge and they are to be fixed on a neutral white or grey base.

The application of the process and equipment according to the invention will be described by the way of an example:

First of all the colour control and integrating device (shown in FIG. 1) is installed onto the enlarger according to the foregoing description. Hereafter, by exposition through the vacant adjusting aperture 2, the enlarger is adjusted so that the sharpness of the negative lying on the base-board, in the desired size, is obtained. The essence of the selection of the negative lies in the average colour distribution of the properly exposed outdoor photo.

In the next step the aperture of the objective is set to the prescribed value and a photographic paper of the proper size is placed—in the darkroom—into the colour-analyser mask. The photographic paper set in place of the picture to be enlarged, i.e. in the middle thereof, is exposed via the diffuser with the time of exposure according to prescriptions (e.g. 80 seconds).

Thereafter the photographic paper taken out from the mask is developed in accordance with the prescriptions of the manufacturer in the usual manner. Out of the yellow, magenta and cyan colour grades one has to select the fields, the grade of density which corresponds to the coloured reference standards on the base of comparison. The time of exposure belonging to said grades are to be read or identified from the time scale. By rotating further the filter supporting disc, another photographic paper is exposed by using said times of exposure, through the additive filters, three times in regular succession. The time scale values corresponding to the yellow-magenta-cyan coloured reference standards indicate the expositions with the blue-green-red filtering.

The colour print having been developed as a result of the process previously described, as well as the enlargements made from the other squares of the negative of the same average density and colour temperature, will be in compliance with reality both in respect to general density and colours.

The application of the equipment according to the invention, which can be produced at low costs, is advantageous not only for amateurs, but also for professional photographers with small studios. The possibility of correction filtering is practically infinite in contrast to the processes performed with the subtractive colour filters of finite intensity i.e., grading. The well known advantage of the additive method lies in the nicer and clearer colours obtained. The colour wedge functions with a high accuracy during the process and it is reliable even under the average circumstances of amateurs. The colour filter may be installed onto already existing enlargers and therefore one may use the apparatus one is accustomed to. At the same time the lower price is accompanied by a better quality and higher reproducibility. By using the solution according to the invention, without special preliminary training and routine, excellent coloured enlargements can be made independent of the subjective colour or perceptional ability different with each individual. The system enables coloured enlarging by photoamateurs, even under domestic circumstances.

What I claim is:

1. A process for the colour-balanced enlargement of coloured prints using the additive method wherein a plurality of coloured filters are sequentially placed in the light path of an enlarger, with the light thereof directed onto a trial print to determine the exposure time, the improvement comprising the steps of passing the light of said enlarger through the negative to be enlarged and a light diffuser element integrating the colour of said light from said negative, placing a plurality of additive filters in the path of said integrated light whereby such integrated light simultaneously impinges on and passes through each of the additive filters for exposure on the trial print, placing a grey wedge between the trial print and the additive filters, the grey wedge having a plurality of density gradations thereon that darken relatively gradually along a given direction with each gradation corresponding to a given time, each of the additive filters producing respective coloured fields of yellow, magenta, and cyan on the trial print with each of the coloured fields having corresponding density gradations which correlate to a given time, said fields being at least 50% darker than the faintest colour shades recognizable by eye and of a density value of a minimun of 0.2.D and comparing the density gradations of the respective coloured fields of the trial print to a coloured reference having a given colour density so that the time of exposure for a colour-balanced enlargement corresponding to the colour density of the reference can be found.

2. The process of claim 1, including the step of calibrating a time scale in compliance with the coloured reference.

3. The process of claim 1, including the step of placing the coloured additive filters in a filter support which is attached to the enlarger, and providing means for moving or adjusting the support in a horizontal and vertical direction with respect to the enlarger.

4. The process of claim 1, including the step of darkening the grey wedge so that the density gradations thereof vary evenly in the given direction each by an amount of from +0.10D. to +0.15D.

5. The process according to claim 1 including the step of forming said reference standard by developing a colour sample on colour print having substantially the same physical characteristics as the colour print product to be used in the course of the enlargement.

6. The process according to claim 1 including the step of forming the reference standard from a predetermined colour dye.

* * * * *